United States Patent [19]
Suzuki

[11] Patent Number: 5,563,666
[45] Date of Patent: Oct. 8, 1996

[54] HIGH LUMINANCE COLOR SUPPRESSION CIRCUIT

[75] Inventor: Fuminori Suzuki, Tokyo, Japan

[73] Assignee: U.S. Philips Corporation, New York, N.Y.

[21] Appl. No.: 423,244

[22] Filed: Apr. 13, 1995

[30] Foreign Application Priority Data

Apr. 18, 1994 [JP] Japan .................................. 6-103314

[51] Int. Cl.⁶ .............................. H04N 9/68; H04N 9/77
[52] U.S. Cl. .......................... 348/645; 348/646; 348/649; 348/256
[58] Field of Search ..................... 348/645, 646, 348/649, 661, 652, 225, 256, 242; H04N 9/68, 9/77

[56] References Cited

U.S. PATENT DOCUMENTS

| | | | |
|---|---|---|---|
| 4,712,132 | 12/1987 | Soca | 358/37 |
| 4,754,323 | 6/1988 | Kaji et al. | 348/256 |
| 4,831,434 | 5/1989 | Fuchsberger | 348/645 |
| 4,996,590 | 2/1991 | Okamoto et al. | 348/645 |
| 5,045,928 | 9/1991 | Takaiwa et al. | 358/29 |
| 5,337,083 | 8/1994 | Murata et al. | 348/645 |
| 5,440,341 | 8/1995 | Suzuki et al. | 348/256 |

*Primary Examiner*—John K. Peng
*Assistant Examiner*—Glenton B. Burgess
*Attorney, Agent, or Firm*—Edward W. Goodman

[57] ABSTRACT

It is an object to avoid suppression of color signals before a green color signal G reaches a saturation detection level Gdet or before each of color signals R and B reaches its saturation level to thereby substantially faithfully reproduce color of an object. To this end, a high luminance color suppressing circuit includes a virtual luminance signal generator for generator for generating a virtual luminance signal Y based on at least one signal of input color signals Rin, Gin and Bin, a coefficient generator for generating a first through a third coefficient $K_1$ through $K_3$ based on a saturation detection level Gdet, a virtual detection level Gth, and maximum output levels Rmax and Bmax, and an output color signal generator for generating output color signals Rout, Gout and Bout based on the virtual luminance signal Y, a minimum coefficient $K_0$ and the color signals Rin, Gin and Bin.

6 Claims, 5 Drawing Sheets

HIGH LUMINANCE COLOR SUPPRESSION CIRCUIT

BACKGROUND OF THE INVENTION

1. Field of the Invention

This invention relates to high luminance color suppressing circuit for suppressing color signals when an image of an object having high luminance is photographed and the color signal is saturated.

2. Description of the Related Art

In a video camera, a CCD (charge coupled device) outputs a color signal the level of which corresponds to the luminance of an object. In photographing an object having high luminance, a state results in which the level (luminance) of the color signal is excessively high. When the level of the color signal is excessively high, so-called color signal saturation occurs. Color signal saturation means a situation in which the color of an object cannot be reproduced. Generally, a high luminance color suppressing circuit is mounted in a video camera. When a color signal is generated that corresponds to an object having high luminance at which color cannot be reproduced, the high luminance color suppressing circuit forcibly sets the color signal to, for example, white.

The level at which the color signal is saturated depends on each color signal. That is, the saturation level of a green color signal G is the lowest. Further, the saturation level becomes higher from the red color signal R to the blue color signal B. The high luminance color suppressing circuit suppresses the color signal and sets it to a value indicating, for example, white, when one of the respective color signals reaches the lowest saturation level, that is, the saturation level (saturation detection level Gdet) of the green color signal G.

An explanation will be given of the operation of a conventional high luminance color suppressing circuit with reference to FIG. 5. FIG. 5 illustrates waveform diagrams showing the operation of a conventional high luminance color suppressing circuit. In FIG. 5, the axis of ordinates (vertical axis) designates a level of a color signal outputted from the high luminance color suppressing circuit, and the axis of abscissa (horizontal axis) designates a level of luminance of an object. The levels of the red color signal Rout, the green color signal Gout and the blue color signal Bout (red, green, blue color signals Rin, Gin and Bin) shown in FIG. 5 signifies a case in which an image of a reddish object, for example, an object having "skin color" is photographed. The level of the red color signal Rout (Rin) is higher than those of the green and blue color signals Gout and Bout (Gin, Bin). When the luminance of the object is enhanced, firstly, the red color signal Rout (Rin) reaches the saturation detection level Gdet (luminance $I_0$), and thereafter, the respective color signals are forcibly set to a content indicating white (Rout=Gout=Bout=Gdet). Thus, for luminance levels less than $I_0$, the colors are reproduced, while for luminance levels exceeding $I_0$, a white color is shown.

SUMMARY OF THE INVENTION

In the conventional high luminance color suppressing circuit, there is the problem that the color signals are set to white in a state in which colors indicated by the color signals can be reproduced, that is, before the green color signal G reaches the saturation detection level Gdet, or before the red and blue signals R and B reach their saturation levels. It is an object of the invention to mitigate this problem.

This invention has been arrived at in view of the above point and provides high luminance color suppressing circuit which avoids the situation in which the suppression of color signals (setting to white) is performed before the green color signal G reaches the saturation detection level Gdet or before each of the red and blue color signals R and B reaches its saturation level, and reproduces the color of an object substantially authentically before the green color signal G reaches the saturation detection level Gdet or before each of the red and blue color signals R and B reaches its saturation level.

According to a first aspect of the present invention, there is provided high luminance color suppressing circuit comprising a virtual luminance signal generating means for generating a virtual luminance signal Y based on at least one signal selected from the group consisting of a red color signal Rin, a green color signal Gin and a blue color signal Bin which are to be inputted;

a coefficient generating means for generating a first coefficient $K_1$ defined as
(Gdet−Gin)/(Gdet−Gth), a second coefficient $K_2$ defined as
(Rmax−Y)/(Rin−Y), a third coefficient $K_3$ defined as
(Bmax−Y)/(Bin−Y), based on a saturation detection level Gdet specifying a level of the green color signal Gin of which color cannot be reproduced, a virtual detection level Gth a desired level of which is set to be less than the saturation detection level Gdet, a red color maximum output level Rmax specifying a maximum level of red color at which output is allowable and a blue color maximum output level Bmax specifying a maximum level of blue color at which output is allowable; and an output color signal generating means for generating an output color signal Rout defined as
Y+(Rin−Y)·$K_0$, an output color signal Gout defined as
Y+(Gin−Y)·$K_0$, an output color signal Bout defined as
Y+(Bin−Y)·$K_0$, where $K_0 \leq 1$ and $K_0$ is a minimum coefficient selected from a group consisting of coefficients of $K_1$, $K_2$ and $K_3$, when the level of the green color signal Gin is equal to or more than the virtual detection level Gth, or when the red color signal Rin is equal to or more than the red color maximum output level Rmax, or when the blue color signal Bin is equal to or more than the blue color maximum output level Bmax.

According to a second aspect of the present invention, there is provided the high luminance color suppressing circuit according to the first aspect, wherein the virtual luminance signal generating means generates a virtual luminance signal Y defined as 0.6·Gin+0.3·Rin+0.1·Bin.

According to a third aspect of the present invention, there is provided the high luminance color suppressing circuit according to the first aspect, wherein the virtual luminance signal generating means generates a virtual luminance signal Y defined as 0.65·Gin+0.25·Rin+0.125·Bin.

According to a fourth aspect of the present invention, there is provided the high luminance color suppressing circuit according to the first aspect, wherein the virtual luminance signal generating means generates a virtual luminance signal Y defined as 0.5·Gin+0.5·Rin.

According to a fifth aspect of the present invention, there is provided the high luminance color suppressing circuit according to the first aspect, wherein the virtual luminance signal generating means outputs a color signal having a maximum level selected from the group consisting of the color signals of Rin, Gin and Bin as the virtual luminance signal Y.

In the high luminance color suppressing circuit of the present invention, the virtual luminance signal generating means generates the virtual luminance signal Y based on at least one signal selected from the group consisting of the red color signal Rin, the green color signal Gin and the blue color signal Bin. Meanwhile, the coefficient generating means generates a first coefficient $K_1$ defined as (Gdet−Gin)/(Gdet−Gth), a second coefficient $K_2$ defined as (Rmax−Y)/(Rin−Y), when the color signal Rin exceeds the saturation detection level Gdet, and a third coefficient $K_3$ defined as (Bmax−Y)/(Bin−Y), when the color signal Bin exceeds the saturation detection level Gdet, based on the saturation detection level Gdet specifying the level at which the green color signal Gin is saturated, the virtual detection level Gth set to the desired level that is less than the saturation detection level Gdet, the red color maximum output level Rmax specifying the maximum level of the red color at which output is allowable and the blue color maximum output level Bmax specifying the maximum level of the blue color at which output is allowable. The output color signal generating means selects the minimum coefficient $K_0$ from the respective coefficients $K_1$ through $K_3$, and generates the output color signal Rout defined as Y+(Rin−Y)·$K_0$, the output color signal Gout defined as Y+(Gin−Y)·$K_0$, and the output color signal Bout defined as Y+(Bin−Y)·$K_0$, when $K_0 \leq 1$. Accordingly, even if the red color signal Rin or the blue color signal Bin reaches the saturation detection level Gdet, unless the green color signal Gin reaches the saturation detection level Gdet, the output color signals Rout, Gout and Bout, which reproduce colors that are substantially the same as the colors exhibited by the color signals Rin, Gin and Bin, are provided.

EXPLANATION OF THE REFERENCE NUMERALS

1 High luminance color suppressing circuit
2 Virtual luminance signal generating means
3 Coefficient generating means
4 Output signal generating means

DESCRIPTION OF THE PREFERRED EMBODIMENT

Figure 1:
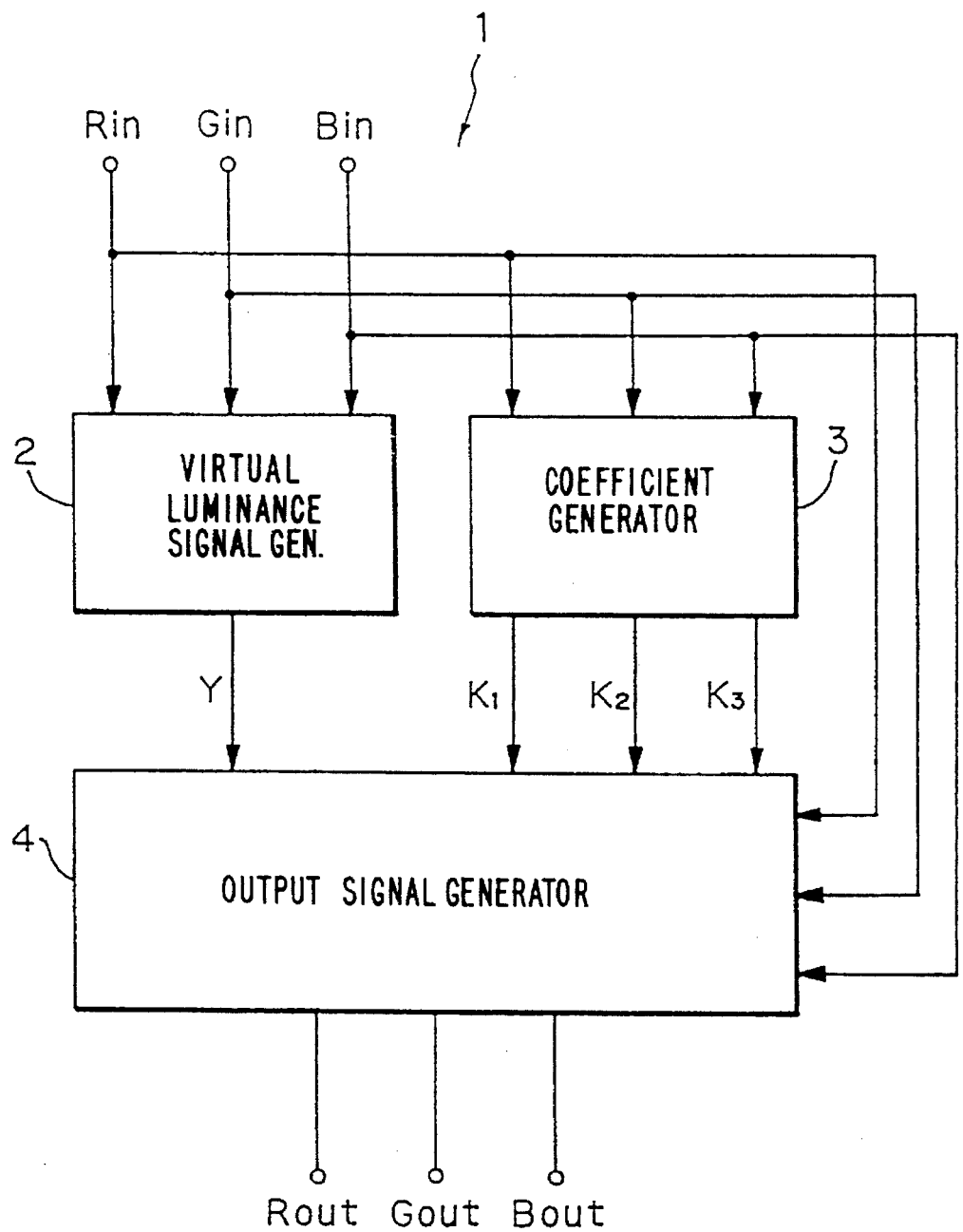
FIG. 1 is a block diagram of high luminance color suppressing circuit of the present invention.

FIG. 1 is a block diagram of high luminance color suppressing circuit of the present invention.

High luminance color suppressing circuit 1 shown in FIG. 1 is constructed by a microprocessor and a digital circuit such as a gate circuit. Three primary color signals which have been converted from analog to digital, that is, a red color signal Rin, a green color signal Gin and a blue color signal Bin are inputted to a virtual luminance signal generating means 2. The virtual luminance signal generating means 2 generates a virtual luminance signal Y establishing, for instance, the following equation (1) based on the three input primary color signals.

$$Y = 0.6 \cdot \text{Gin} + 0.3 \cdot \text{Rin} + 0.1 \cdot \text{Bin} \quad (1)$$

Meanwhile, a coefficient generating means 3 generates a first coefficient $K_1$ establishing the following equation (2), a second coefficient $K_2$ establishing the following equation (3) and a third coefficient $K_3$ establishing the following equation (4), based on the virtual luminance signal Y, a saturation detection level Gdet, a virtual detection level Gth, a red color maximum output level Rmax and a blue color maximum output level Bmax.

$$K_1 = (\text{Gdet} - \text{Gin})/(\text{Gdet} - \text{Gth}) \quad (2)$$

$$D_2 = (\text{Rmax} - Y)/(\text{Rin} - Y) \quad (3)$$

$$K_3 = (\text{Bmax} - Y)/(\text{Bin} - Y) \quad (4)$$

Here, the saturation detection level Gdet is a threshold specifying a level at which the color signal Gin is saturated. The virtual saturation level Gth is a threshold having a desired value less than the saturation detection level Gdet, for example, approximately 70 through 90% (approximately 80% in the embodiment) of the saturation detection level Gdet, which can be set to an arbitrary level other than 0. The red color maximum output level Rmax and the blue color maximum output level Bmax are thresholds each of which specifies a maximum level (for example, a maximum level (100%) of a video signal) of red color or blue color which allows an output from the high luminance color suppressing circuit 1, and which is generally valued lower than the saturation detection level Gdet.

The virtual luminance signal Y, which has been generated by the virtual luminance signal generating means 2, and the first through the third coefficients $K_1$ through $K_3$, which have been generated by the coefficient generating means 3, are inputted to an output color signal generating means 4. The output color signal generating means 4 firstly selects a minimum coefficient $K_0$ from the input first through third coefficient, $K_1$ through $K_3$. Thereafter, the output color signal generating means 4 generates output color signals, that is, an output color signal Rout of red color establishing the following equation (5), an output color signal Gout of green color establishing the following equation (6) and an output color signal Bout of blue color establishing the following equation (7).

$$R_{out}=Y+(R_{in}-Y)\cdot K_0 \quad (5)$$

$$G_{out}=Y+(G_{in}-Y)\cdot K_0 \quad (6)$$

$$B_{out}=Y+(B_{in}-Y)\cdot K_0 \quad (7)$$

Figure 2:
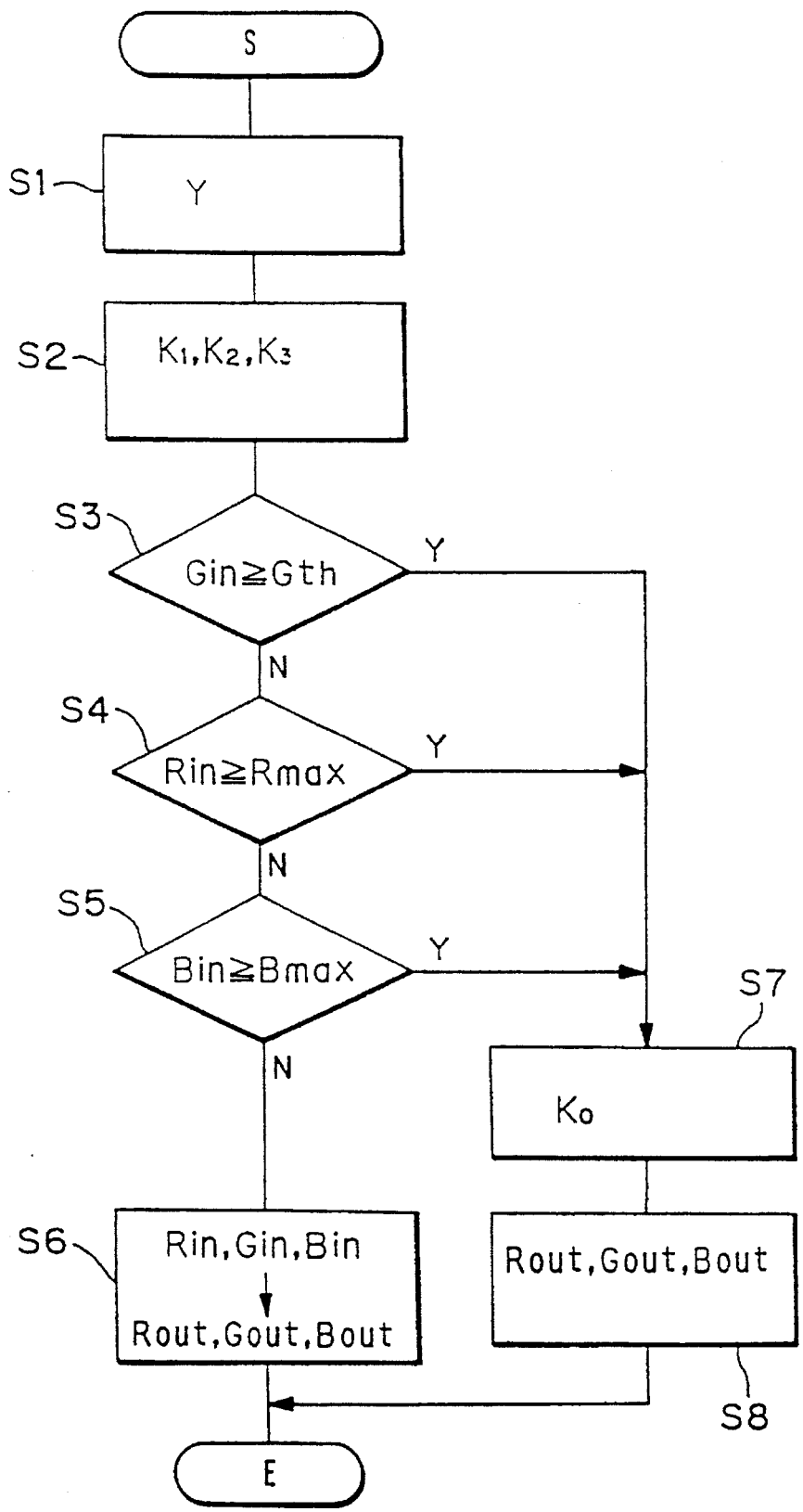
FIG. 2 is flowchart showing the operation of the high luminance color suppressing circuit of the present invention.
Figure 3:
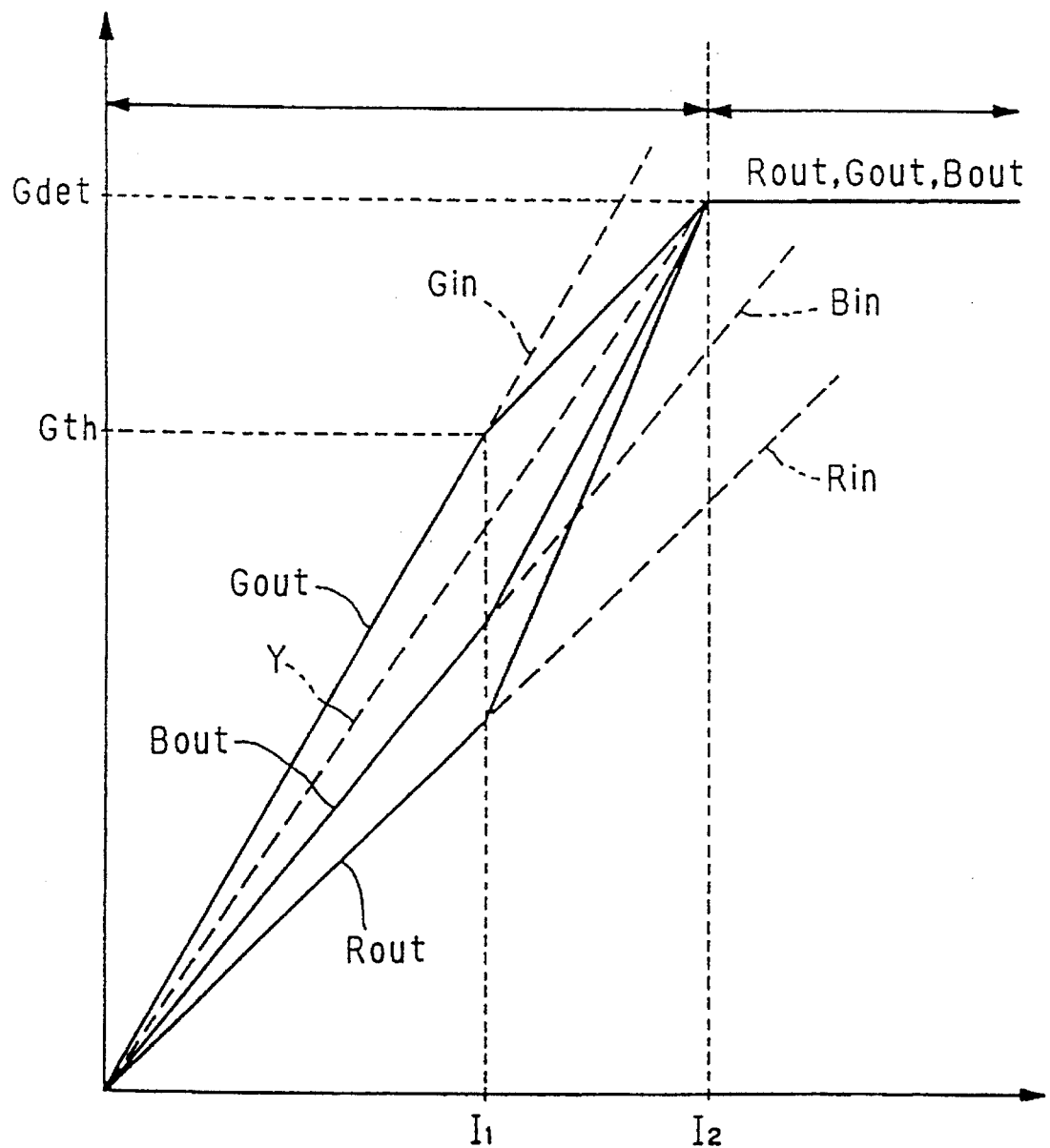
FIG. 3 illustrates first waveform diagrams showing the operation of the high luminance color suppressing circuit of the present invention.
Figure 4:
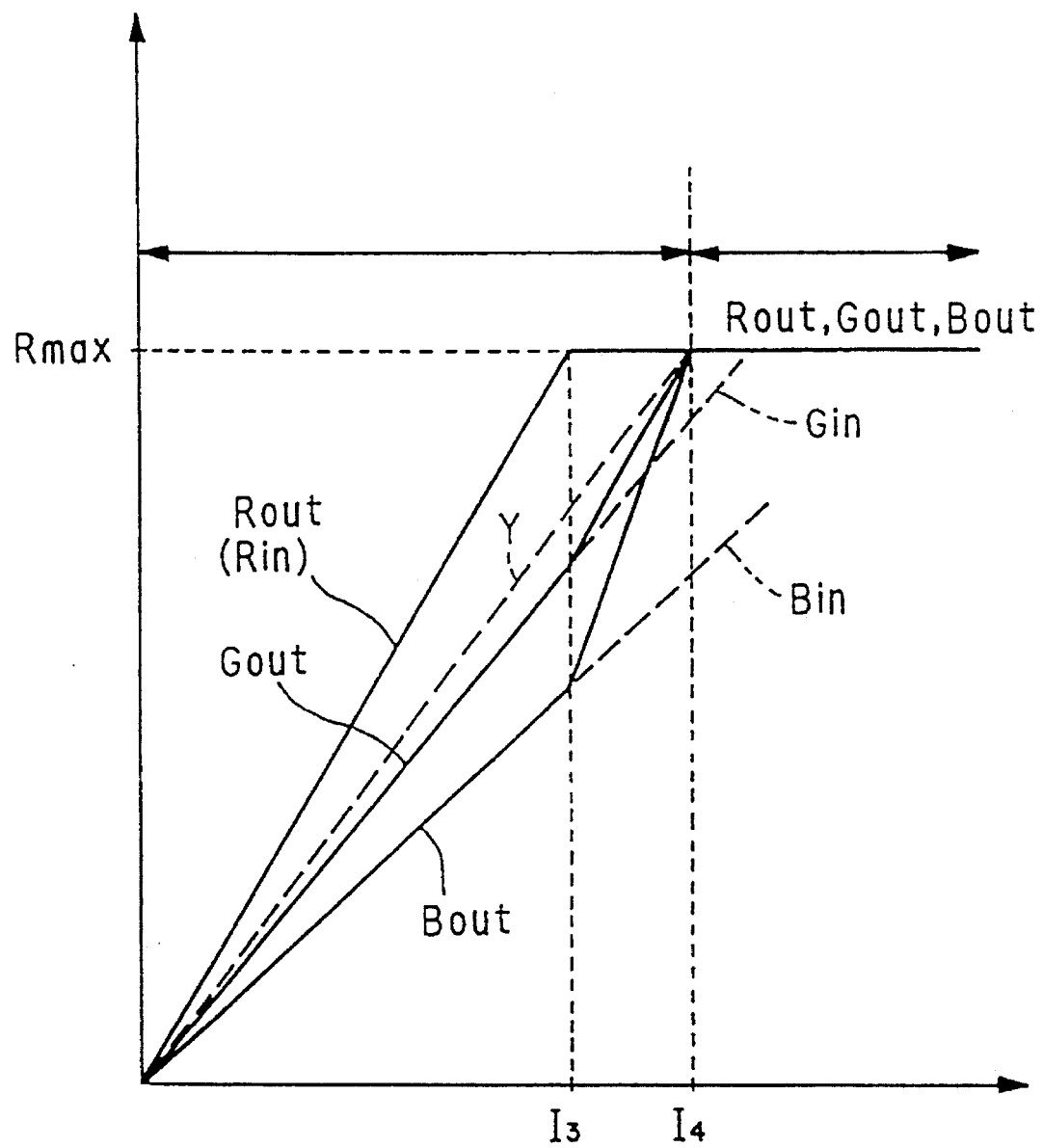
FIG. 4 illustrates second waveform diagrams showing the operation of the high luminance color suppressing circuit of the present invention.
Figure 5:
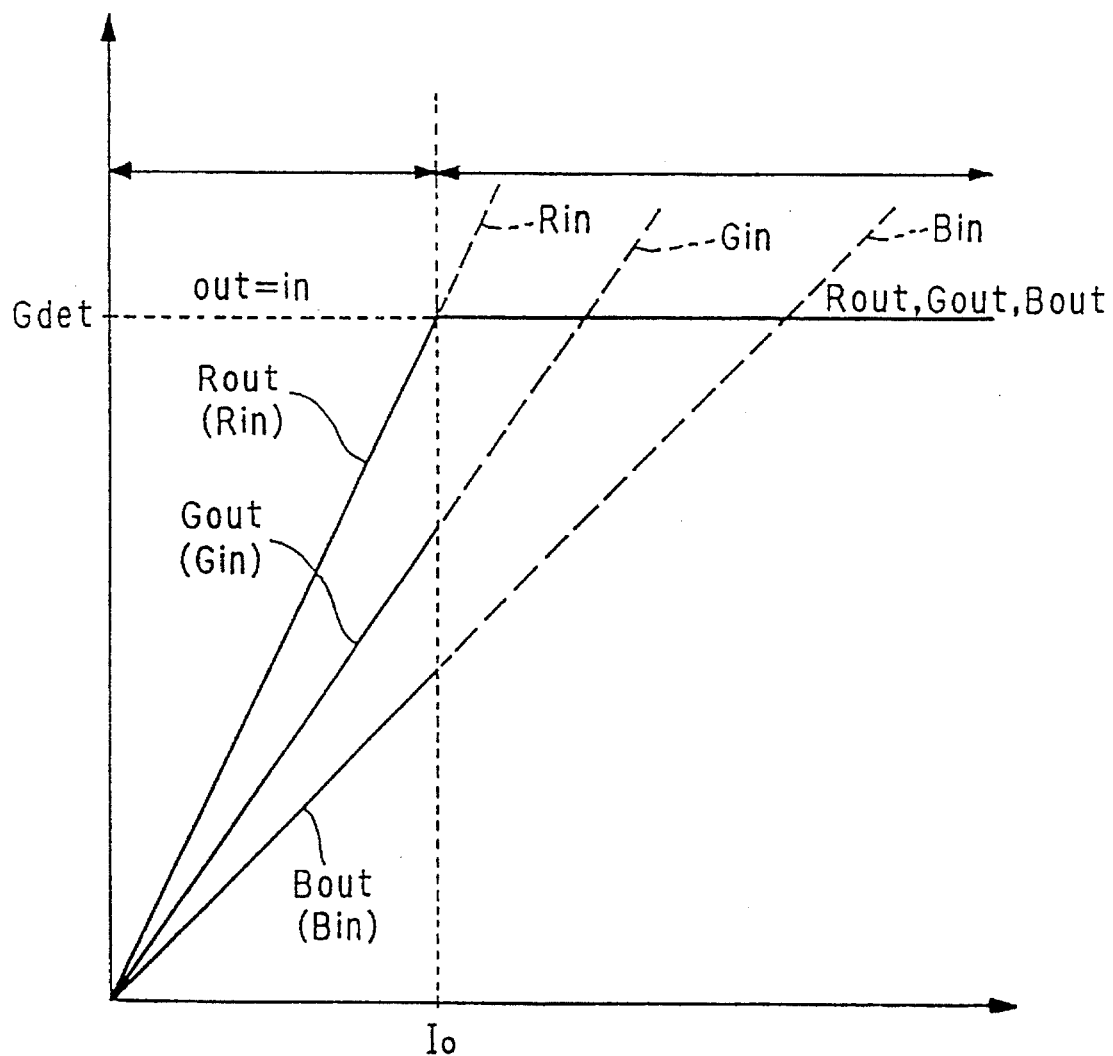
FIG. 5 illustrates waveform diagrams showing the operation of a conventional high luminance color suppressing circuit.

An explanation will be given of the operation of the invented high luminance color suppressing circuit 1 in reference to FIG. 2 through FIG. 4. FIG. 2 is a flowchart showing the operation of the high luminance color suppressing circuit of the present invention (S indicates Start, E indicates End). FIG. 3 illustrates first waveform diagrams showing the operation of the high luminance color suppressing circuit. FIG. 4 illustrates second waveform diagrams showing the operation of the invented high luminance color suppressing circuit. In FIG. 3 and FIG. 4, the axis of ordinates (vertical axis) designates a level of a color signal outputted from the high luminance color suppressing circuit 1, and the axis of abscissa (horizontal axis) designates a level of an exposure (luminance).

When the red, green and blue color signals Rin, Gin and Bin are inputted to the high luminance color suppressing circuit 1, the virtual luminance signal generating means 2 generates the virtual luminance signal Y (FIG. 2: step S1). The generating of the virtual luminance signal Y is carried out successively or at a predetermined period.

On the other hand, the coefficient generating means 3 generates the first through the third coefficient $K_1$, $K_2$ and $K_3$ based on the respective color signals Rin, Gin and Bin (step S2).

The output color signal generating means 4 determines whether the green color signal Gin is equal to or more than the virtual detection level Gth (step S3). If the result of this determination is no, the output color signal generating means 4 determines whether the red color signal Rin is equal to or more than the maximum output level Rmax (step S4). If the result of this determination is no, the output color signal generating means 4 further determines whether the blue color signal Bin is equal to or more than the maximum output level Bmax (step S5).

As shown in FIG. 3, when the green color signal Gin is equal to or more than the virtual detection level Gth, the result of this determination in step S3 is yes. Receiving the result of the determination, the output color signal generating means 4 selects the minimum coefficient $K_0$ from the first through third coefficients, $K_1$, $K_2$ and $K_3$ (step S7). Further, the output color signal generating means 4 generates the output color signals Rout, Gout and Bout based on the respective color signals Rin, Gin and Bin, the virtual luminance value Y and the coefficient $K_0$ (step S8). When step S8 is performed (the luminance is equal to or more than a luminance $I_1$ and less than a luminance $I_2$: FIG. 3), the output color signal generating means 4 (high luminance color suppressing circuit 8) outputs the output color signals Rout, Gout and Bout, maintaining a correlation among the respective color signals Rin, Gin and Bin, although they are different from the actual color signals Rin, Gin and Bin. Further, when the luminance reaches $I_2$, the output color signal generating means 4 sets Rout =Bout=Bout=Gdet (setting to white). Thus, for exposure levels less than $I_2$, the colors are reproduced, while for exposure levels exceeding 12, a white color is shown.

When the red color signal Rin shows a value that is equal to or more than the maximum output level Rmax (luminance $I_3$) as shown in FIG. 4, the result of the determination in step S4 is yes. Based on the result of this determination, the output color signal generating means 4 carries out steps S7 and S8, and generates the output color signals Rout, Gout and Bout. Further, when the luminance is equal to or more than I3 and less than $I_4$, the output color signal Rout is set to the maximum output level Rmax.

Similarly, when the result of the determination in step S5 is yes, steps S7 and S8 are carried out, and the output color signals Rout, Gout and Bout are generated. Further, the output color signal generating means 4 can forcibly set the value of the output color signal Rout to the maximum output level Rmax when the result in step S4 is yes, and the value of the output color signal Bout to the maximum output level Bmax when the result in step S5 is yes, respectively.

When the result of step S5 is no, high luminance color suppression processing is not performed. That is, the output color signal generating means 4 outputs the respective color signals Rin, Gin and Bin as the output color signals Rout, Gout and Bout.

As explained above, when the processings of steps S1 through S8 are carried out in the high luminance color suppressing circuit 1, the output color signal Rout of red color, the output color signal Gout of green color and the output color signal Bout of blue color, in which the processing of the high luminance color suppression is performed while maintaining the correlation among the color signals Rin, Gin and Bin, are provided.

This invention is not restricted to the above embodiment. Although the first through third coefficient $K_1$ through $K_3$ are generated in the example, it is not necessary to form them when the coefficient $K_0$ is set to "1", that is, when the levels of the respective color signals Rin, Gin and Bin with respect to the saturation detection level Gdet are not considered. This example can be disposed of easily by forcibly setting the coefficient $K_0$ to "1" in the output color signal generating means 4, or by removing the structure of the coefficient generating means 3 from the high luminance color suppressing circuit 1 and performing a calculation with no reference to the coefficient $K_0$ in the output signal generating means 4.

The virtual luminance signal generating means 2 may form a virtual luminance signal Y, establishing the following equation (8) or (9) other than the equation (1).

$$Y=0.625\cdot Gin+0.25\cdot Rin+0.125\cdot Bin \quad (8)$$

$$Y=0.5\cdot Gin+0.5\cdot Rin \quad (9)$$

Further, the virtual luminance signal generating means 2 may compare the levels of the color signals Rin, Gin and Bin at the timing of generating the virtual luminance signal Y, and may use the color signal having the maximum level as the virtual luminance signal Y.

According to the high luminance color suppression of the present invention, no situation takes place in which the color signals are suppressed where only the color signal R and/or the color signal G exceed the-saturation detection level Gdet and suppression of the color signals is not performed until the color signal G exceeds the saturation detection level Gdet, by which means output color signals having colors that are substantially equal to those exhibited by the input color signals can be provided.

What is claimed is:

1. High luminance color suppressing circuit comprising:

virtual luminance signal generating means for generating a virtual luminance signal Y based on at least one signal selected from a group of signals to be inputted, including a red color signal Rin, a green color signal Gin and a blue color signal Bin;

coefficient generating means for generating a first coefficient K1 defined as $(Gdet-Gin)/(Gdet-Gth)$, a second coefficient $K_2$ defined as $(Rmax-Y)/(Rin-Y)$, and a third coefficient $K_3$ defined as $(Bmax-Y)/(Bin-Y)$, based on a saturation detection level Gdet specifying a level of the green color signal Gin at which color cannot be reproduced, a virtual detection level Gth, a desired level of which is set to be less than the saturation detection level Gdet, a red color maximum output level Rmax specifying a maximum level of red color at which output is allowable and a blue color maximum output level Bmax specifying a maximum level of blue color at which output is allowable; and output color signal generating means for generating an output color signal Rout defined as $Y+(Rin-Y) \cdot K_0$, an output color signal Gout defined as $Y+(Gin-Y) \cdot K_0$, and an output color signal Bout defined as $Y+(Bin-Y) \cdot K_0$, where $K_0 \leq 1$ and $K_0$ is a minimum coefficient selected from a group consisting of respective coefficients of $K_1$, $K_2$ and $K_3$, when the level of the green color signal Gin is equal to or more than the virtual detection level Gth, when the red color signal Rin is equal to or more than the red color maximum output level Rmax, or when the blue color signal Bin is equal to or more than the blue color maximum output level Bmax.

2. The high luminance color suppressing circuit as claimed in claim 1, characterized in that the virtual luminance signal generating means generates a virtual luminance signal Y defined as $0.6 \cdot Gin + 0.3 \cdot Rin + 0.1 \cdot Bin$.

3. The high luminance color suppressing circuit as claimed in claim 1, characterized in that the virtual luminance signal generating means generates a virtual luminance signal Y defined as $0.625 \cdot Gin + 0.25 \cdot Rin + 0.125 \cdot Bin$.

4. The high luminance color suppressing circuit as claimed in claim 1, characterized in that the virtual luminance signal generating means generates a virtual luminance signal Y defined as $0.5 \cdot Gin + 0.5 \cdot Rin$.

5. The high luminance color suppressing circuit as claimed in claim 1, characterized in that the virtual luminance signal generating means outputs a color signal having a maximum level selected from a group consisting of the color signals of Rin, Gin and Bin as the virtual luminance signal Y.

6. High luminance color suppression method comprising the steps of:

generating a virtual luminance signal Y based on one or at least two selected from a group of signals to be inputted including of a red color signal Rin, a green color signal Gin and a blue color signal Bin;

generating a first coefficient K1 defined as $(Gdet-Gin)/(Gdet-Gth)$, a second coefficient $K_2$ defined as $(Rmax-Y)/(Rin-Y)$, and a third coefficient $K_3$ defined as $(Bmax-Y)/(Bin-Y)$, based on a saturation detection level Gdet specifying a level of the green color signal Gin at which color cannot be reproduced, a virtual detection level Gth, a desired level of which is set to be less than the saturation detection level Gdet, a red color maximum output level Rmax specifying a maximum level of red color at which output is allowable and a blue color maximum output level Bmax specifying a maximum level of blue color at which output is allowable; and generating an output color signal Rout defined as $Y+(Rin-Y) \cdot K_0$, an output color signal Gout defined as $Y+(Gin-Y) \cdot K_0$, and an output color signal Bout defined as $Y+(Bin-Y) \cdot K_0$, where $K_0 \leq 1$ and $K_0$ is a minimum coefficient selected from a group consisting of respective coefficients of $K_1$, $K_2$ and $K_3$, when the level of the green color signal Gin is equal to or more than the virtual detection level Gth, when the red color signal Rin is equal to or more than the red color maximum output level Rmax, or when the blue color signal Bin is equal to or more than the blue color maximum output level Bmax.

* * * * *